United States Patent
Christy et al.

(10) Patent No.: US 8,487,469 B2
(45) Date of Patent: Jul. 16, 2013

(54) SOLAR WIND TREE

(76) Inventors: Frank L. Christy, Vero Beach, FL (US); Stephen C. Keiser, Vienna, WV (US); David M. Archer, Lowell, OH (US)

( * ) Notice: Subject to any disclaimer, the term of this patent is extended or adjusted under 35 U.S.C. 154(b) by 340 days.

(21) Appl. No.: 12/710,331

(22) Filed: Feb. 22, 2010

(65) Prior Publication Data

US 2010/0289269 A1  Nov. 18, 2010

Related U.S. Application Data

(60) Provisional application No. 61/154,390, filed on Feb. 21, 2009.

(51) Int. Cl.
*F03D 9/00* (2006.01)

(52) U.S. Cl.
USPC .................................... 290/55; 290/2

(58) Field of Classification Search
USPC ............................ 290/1 R, 44, 55, 2; 416/41
See application file for complete search history.

(56) References Cited

U.S. PATENT DOCUMENTS

| | | | |
|---|---|---|---|
| 4,200,904 A | 4/1980 | Doan | |
| 5,182,458 A * | 1/1993 | McConachy | 290/55 |
| 5,254,876 A | 10/1993 | Hickey | |
| 5,313,377 A * | 5/1994 | Kasboske | 362/122 |
| 5,983,634 A | 11/1999 | Drucker | |
| 6,661,113 B1 | 12/2003 | Bonin | |
| 7,008,171 B1 * | 3/2006 | Whitworth | 415/4.2 |
| 7,040,858 B2 | 5/2006 | Suzuki | |
| 7,045,702 B2 | 5/2006 | Kashyap | |
| 7,321,173 B2 | 1/2008 | Mann | |
| 7,453,167 B2 | 11/2008 | Gilbert | |
| 7,638,891 B2 | 12/2009 | Fein | |
| 7,928,595 B1 * | 4/2011 | Gonzalez-Carlo | 290/54 |
| 8,058,738 B1 * | 11/2011 | Bertz | 290/2 |
| 2003/0170123 A1 * | 9/2003 | Heronemus | 416/41 |
| 2003/0230333 A1 * | 12/2003 | Kashyap | 136/243 |
| 2005/0045224 A1 * | 3/2005 | Lyden | 136/291 |
| 2007/0090653 A1 * | 4/2007 | Martelon | 290/55 |
| 2007/0287389 A1 | 12/2007 | Pockat | |
| 2008/0116694 A1 * | 5/2008 | Hendershot | 290/1 R |
| 2008/0148732 A1 * | 6/2008 | Fein et al. | 60/641.3 |
| 2008/0181777 A1 | 7/2008 | Bailey | |
| 2009/0074577 A1 | 3/2009 | Semov | |
| 2009/0244890 A1 | 10/2009 | Pelken | |
| 2009/0261595 A1 | 10/2009 | Poo | |
| 2009/0262525 A1 | 10/2009 | Lai | |
| 2010/0013310 A1 | 1/2010 | Day | |
| 2010/0158673 A1 * | 6/2010 | Keene | 415/121.3 |
| 2010/0270806 A1 * | 10/2010 | Estrada | 290/55 |

FOREIGN PATENT DOCUMENTS

| | | | |
|---|---|---|---|
| JP | 2001295751 A | * | 10/2001 |
| WO | WO 2009045349 A2 | * | 4/2009 |

* cited by examiner

*Primary Examiner* — Tulsidas C Patel
*Assistant Examiner* — Viet Nguyen
(74) *Attorney, Agent, or Firm* — John L. DeAngelis; Buesse Wolter Sanks Mora & Marie, P.A.

(57) ABSTRACT

An apparatus for generating electrical power. The apparatus comprises a plurality of solar energy collectors for generating electricity from solar energy; a plurality of wind turbines for generating electricity from wind energy; a support structure having arms extending radially from a vertical shaft, the arms positioned at different vertical distances along the vertical shaft and the arms having different lengths; solar energy collectors and the wind turbines affixed to terminal ends of the arms; and the support structure comprising camouflage elements causing the support structure to resemble vegetation.

10 Claims, 8 Drawing Sheets

SOLAR WIND TREE

CROSS REFERENCE TO RELATED APPLICATIONS

This patent application claims the benefit of the provisional patent application No. 61/154,390 filed on Feb. 21, 2009, entitled Solar Wind Tree.

FIELD OF THE INVENTION

This invention relates to methods and apparatuses that disclose a combination solar and wind electricity generating apparatus.

BACKGROUND OF THE INVENTION

Both solar and wind generating apparatuses are known, but each has several disadvantageous features primarily due to their large size and unsightly appearance. Although solar panels can be roof-mounted and their appearance somewhat obscured, wind turbines are especially problematic in this regard. They are constructed hundreds of feet from the ground and to generate a maximum amount of electricity the turbine blades are typically several feet across. Thus wind farms, comprising many such wind turbines, are located away from residential and business areas.

BRIEF DESCRIPTION OF THE DRAWINGS

The present invention can be more easily understood and the further advantages and uses thereof more readily apparent, when considered in view of the following detailed description when read in conjunction with the following figures, wherein.

In accordance with common practice, the various described features are not drawn to scale, but are drawn to emphasize specific features relevant to the invention. Reference characters denote like elements throughout the figures and text.

DETAILED DESCRIPTION OF THE INVENTION

Before describing in detail the particular methods and apparatuses related to a combination solar and wind generating apparatus, it should be observed that the present invention resides primarily in a novel and non-obvious combination of elements and process steps. So as not to obscure the disclosure with details that will be readily apparent to those skilled in the art, certain conventional elements and steps have been presented with lesser detail, while the drawings and the specification describe in greater detail other elements and steps pertinent to understanding the inventions.

The presented embodiments are not intended to define limits as to the structures, elements or methods of the inventions, but only to provide exemplary constructions. The embodiments are permissive rather than mandatory and illustrative rather than exhaustive.

It would be beneficial to develop a combination wind and solar electricity generating apparatus for maximizing the amount of electricity generated from our natural resources and further having an appearance that is aesthetically pleasing. The objective is to locate the wind/solar electrical generator within a residential or commercial area. With the source of electricity proximate the user of electricity, losses during transmission of the electricity are drastically reduced. The homeowner or business owner can take responsibility and control the generation of electricity for personal/business consumption.

One of the present inventors was suddenly struck by the idea of a solar wind tree while riding on a train just west of Amsterdam in the Netherlands two years ago. He observed the large number of wind turbines already in use and clearly visible from the train.

As the train stopped at a small station the inventor noticed the trees next to the platform and observed the breeze blowing through the trees. He observed that every tree leaf was moving while at the same time nearly every leaf was exposed to the bright sunlight overhead. It occurred to this inventor that if one could capture both the solar energy and wind energy using a "tree" one might be able to maximize the benefit of both forms of environmentally friendly energy.

He then questioned why one could not configure both solar panels and wind turbines in the form of a tree and thus maximize use of both the wind turbines and the solar panels from a single structure. Additionally, such a solar/wind generator in the form of a tree, or another natural or man-made object, can be designed and constructed to be aesthetically pleasing to the eye by incorporating solid design elements that imitate foliage and soften the visual effects of the "tree."

Figure 1:
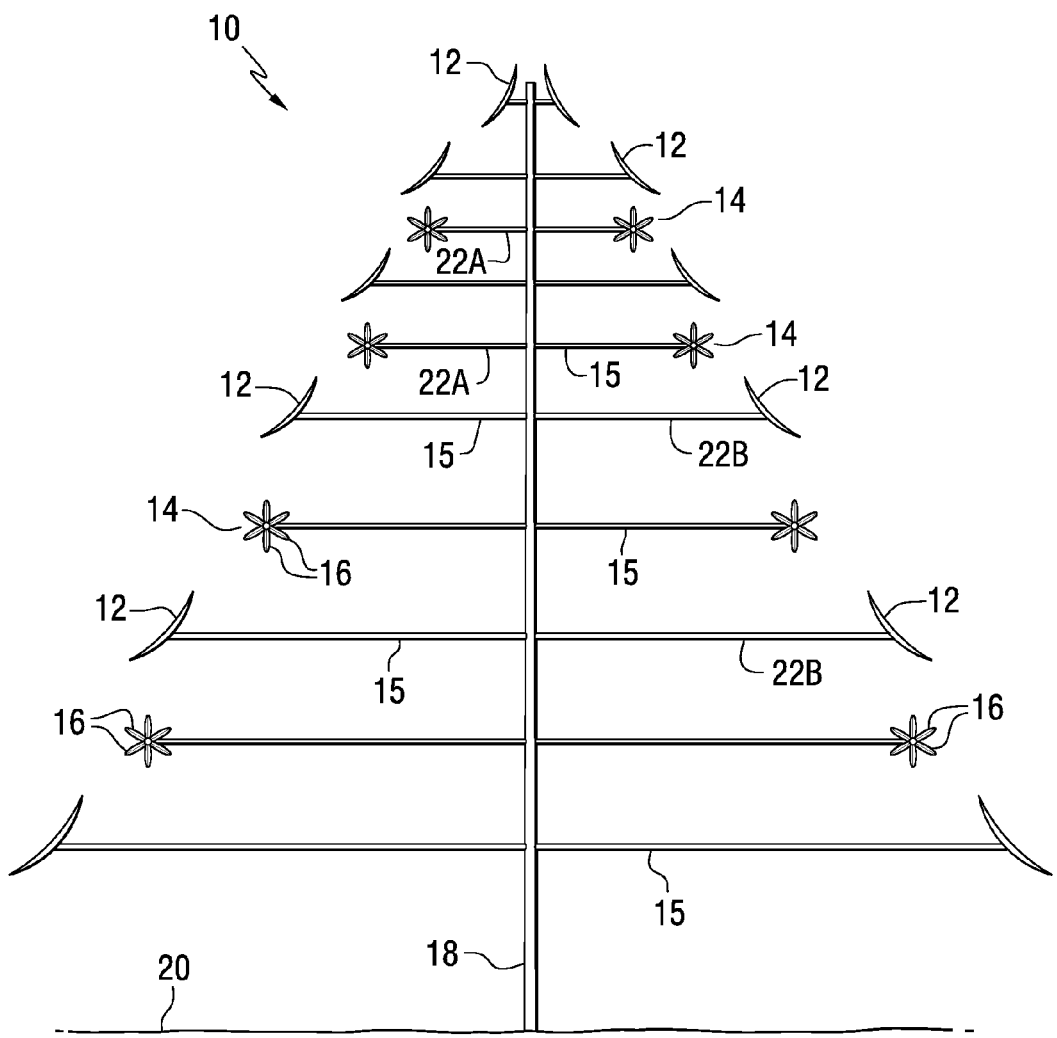
FIG. 1 depicts a cross-section through one embodiment of a solar/wind "tree" of the present invention.

FIG. 1 depicts a cross-section through one embodiment of such a solar/wind "tree" 10 comprising a plurality of solar collectors 12 and wind turbines 14 affixed to arms 15 extending from a central supporting "trunk" or vertical shaft 18 extending from ground 20. Each wind turbine 14, comprising a plurality of substantially vertical wind turbine blades 16, supplies rotational torque to a proximately-mounted generator (not shown, but typically mounted in the same hub or enclosure as the wind turbine) for producing electricity. Generally, the electricity is fed to conductors 22A that extend along the tree "branches" (the arms 15) and may be joined to other conductors that extend along the tree trunk 18. Similarly, electricity generated by the solar collectors 12 is carried over conductors 22B to the trunk 18. The conductors 22A and 22B may be joined or remain separate, the latter to provide two separate sources of electricity.

As illustrated in FIG. 1, the solar energy collectors 12 are disposed at various levels (or vertical heights from the ground) along the "trunk" or vertical shaft 18, with the wind turbines disposed at alternating levels. However, this figure presents an exemplary embodiment as other configurations are possible for the solar collectors 12 and the wind turbines 14. For example, both collector types can be affixed to the same arm 15.

The blades 16 of each wind turbine 14 are substantially perpendicular to the ground. Both the blade angle relative to the ground and the blade pitch may be adjustable.

Figure 2:
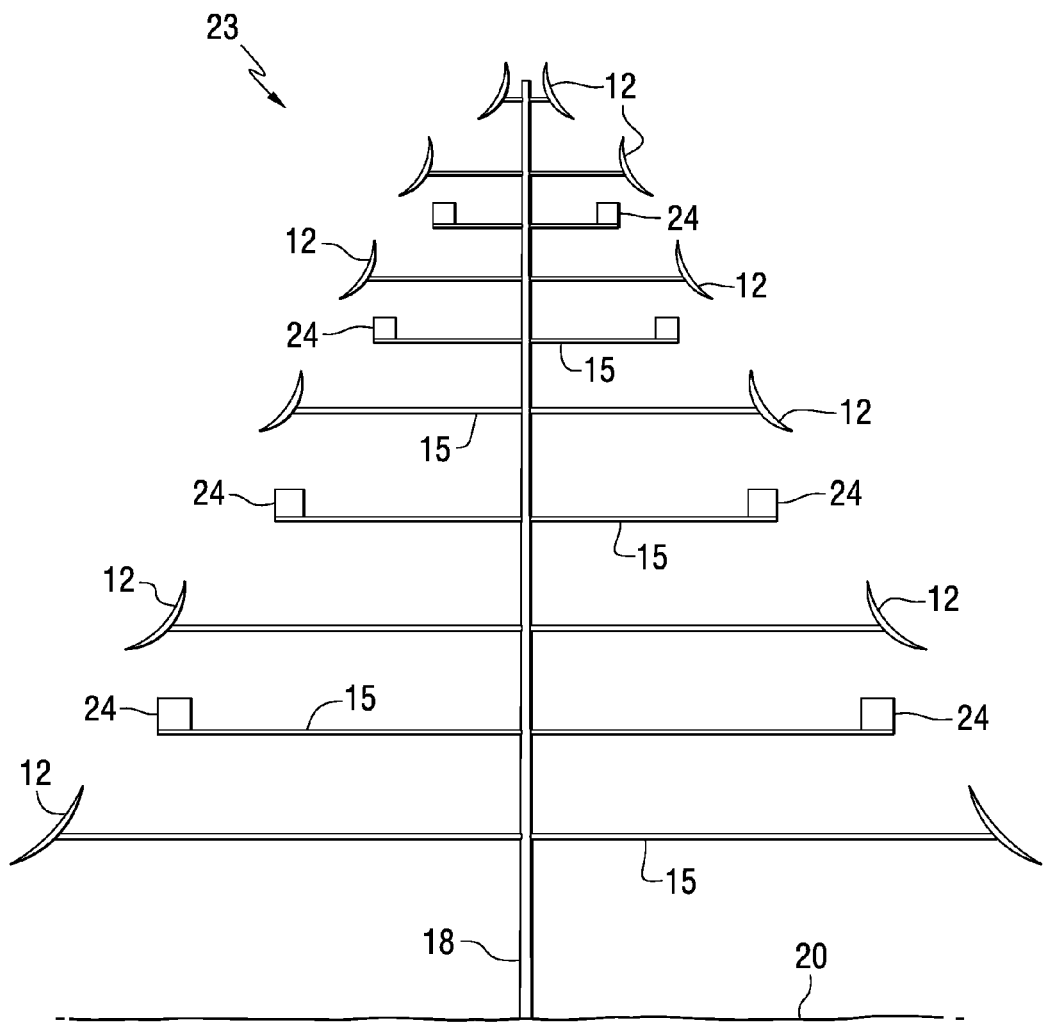
FIG. 2 illustrates a second embodiment of a solar/wind tree according to the present invention.
Figure 16:
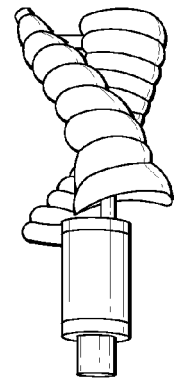
FIG. 16 illustrates a helical wind turbine for use with the present invention.

FIG. 2 illustrates a solar wind tree 23 comprising helical wind turbines 24, as further depicted in FIG. 16 and available from Helical Wind, Inc of San Diego, CA.

In both the embodiments of FIGS. 1 and 2, the orientation of each wind turbine may be fixed or adjustable, with a selected orientation responsive to an expected predominant wind direction and wind velocity.

Also, in the embodiments of both FIGS. 1 and 2, the curvature and angle with respect to the vertical of each solar collector 12 may be fixed or adjustable to take advantage of an expected sun angle at the location of the solar wind tree 10/23. The wind turbines may be disposed on the same arm or "branch" as the solar collectors or on a different branch (as illustrated in FIGS. 1 and 2) if that arrangement is more efficient for capturing the maximum wind velocity. The illustrated embodiments showing alternating wind turbines and solar collectors is merely exemplary.

Taking advantage of the natural shape of a pine tree, for example, the solar/wind tree 10/23 narrows to an apex at the top so that higher-mounted solar collectors 12 do not obscure the sunlight from lower-mounted collectors 12. In this embodiment the solar collectors are slightly curved to enhance sunlight capture as the sun moves across the sky and to present an airfoil structure that directs the wind to the turbines of the solar/wind tree. An airfoil shape is selected to maximize the velocity of the wind striking the wind turbine blades. Other shapes beyond the concave shapes illustrated may be used. The curve of the solar collector may be concave or convex depending on the design that optimizes electricity produced by the solar collectors 12 and the wind turbines 14/24.

In another embodiment the orientation of each solar collector 12 is automatically controlled to track the sun as it traverses the sky. For example, the tilt angle (the angle of each solar collector with respect to a vertical line) is controllable to maximize sun exposure. Also, an angle of each blade for each wind turbine 14/24 and the angle of the rotational axis is controllable to optimize the direction at which the wind strikes the blades. Mechanical devices for tracking the sun and positioning the collector in response thereto are known by those skilled in the art. The solar collectors may also be fixedly oriented to receive optimum solar energy as determined by the installation site.

The wind turbines 14/24 each comprise a plurality of blades extending from a rotating drive shaft that turns an electricity-generating generator. The generator may produce alternating or direct current, and operates according to commutation and induction principles, as is known to those skilled in the art. The present invention is intended to encompass all types of apparatuses for generating electricity from solar and wind sources.

Figure 3:
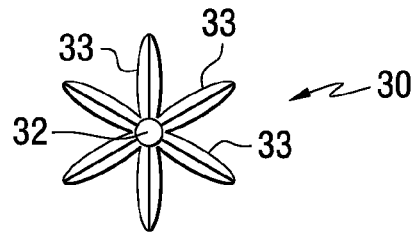
FIG. 3 illustrates a front view of a blade wind turbine.

FIG. 3 illustrates a front view of a turbine blade 30 (with an axis of rotation 32 perpendicular to a plane of the page) and blades 33 extending from the axis of rotation 32.

Figure 4:
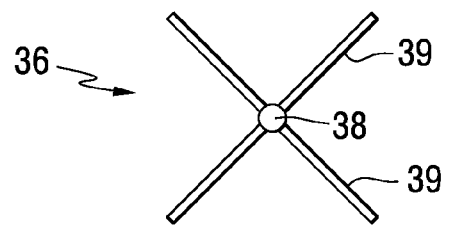
FIG. 4 illustrates a side view of a paddle wheel-like wind turbine.

In another embodiment, a wind turbine comprises a plurality of surfaces each having one edge joined in a radial pattern to a central drive shaft (e.g., a paddle wheel). As the wind strikes the paddles, the drive shaft turns and drives the electrical generator connected thereto. FIG. 4 illustrates a side view of a paddle wheel-like propeller 36 with an axis of rotation 38 (perpendicular to a plane of the page) and plurality of paddles 39.

Figure 5:
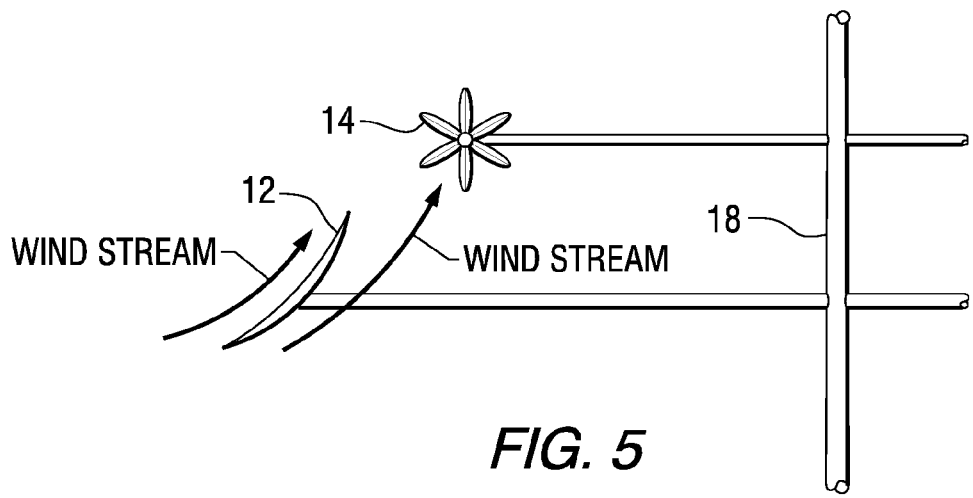
FIG. 5 illustrates a solar collector functioning as an air foil to direct a wind stream toward the wind turbine.

Use of different turbine designs and different turbine blade designs to maximize turbine efficiency and power output depends on the specific installation and orientation details and anticipated wind speeds. Ideally the solar collector 12 incorporates an airfoil design, for example comprising a small "wing," to increase the wind speed and direct the wind stream on to the wind turbine blades. The turbine will therefore more efficiently "harvest" the maximum output from the available wind. FIG. 5 illustrates a wind stream created by the solar collector 12 directed toward the wind turbine 14. Flat solar collectors (not illustrated) can also be used, although they may reduce the efficiency of the wind turbines.

Figure 6:
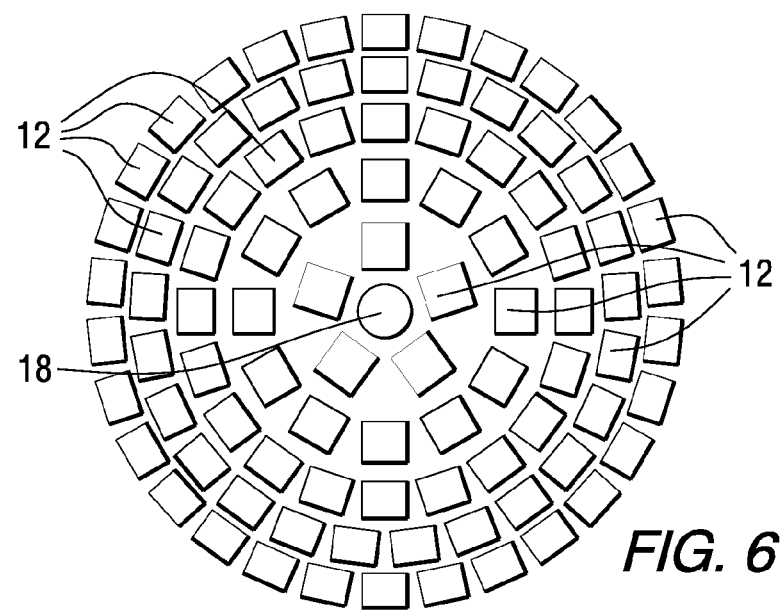
FIG. 6 illustrates a top-down view of the solar/wind tree of the present invention.

FIG. 6 depicts a top-down view of the solar/wind tree, showing only the solar collectors 12 and the tree trunk 18.

It is preferable that the overall solar/wind tree design be compatible with installation in a typical neighborhood; the visual design component is therefore important. The overall structure, in one embodiment, is predominantly green in color with dark solar collectors. The overall visual impression is intended to blend nicely and look like, in essence, a unique form of a "tree." One preferable installation includes the yard of a home. Therefore having the "tree" blend with the other vegetation may be important. Artificial foliage (leaves, for example) can also be incorporated into the tree 10/23 to soften its visual appearance and make the solar wind tree more esthetically pleasing.

It is known that cell towers are designed to mimic trees in some locations, especially where zoning ordinances may prohibit cell towers that do not blend with the natural vegetation. These same objections may be raised against the solar/wind tree of the embodiments of the present invention. Thus the wind turbines and solar energy collectors may be designed to appear as natural vegetation to the cursory viewer. Additionally, the "tree" may include some artificial leaves, branches and other elements to camouflage the wind turbines and solar collectors and make the tree appear more realistic. The ultimate commercial success of the present invention suggests that "being a good neighbor" (e.g., blending with the natural vegetation) is important.

In one embodiment both the solar collectors and the wind turbines generate DC electricity allowing use of a single power conductor to emerge from the solar wind tree. The DC electricity is converted to 60 Hz AC electricity in an inverter (not shown) for direct use by a consumer or for input to the electrical grid. The inverter and associated controls can be located at the base of "tree" or in a separate proximate structure.

The size of the tree generally determines the overall energy output from the wind turbines 14/24 and the solar collectors 12. Although a large tree(s) might be desirable, zoning codes or neighborhood aesthetics may limit "tree" size. A taller tree provides a higher wind turbine efficiency since the wind speed generally increases as a function of distance from the ground. In one embodiment the wind turbines are installed only on the upper levels of the tree where the wind is more effective in generating usable power. The solar component operates at about the same efficiency irrespective of distance from the ground.

Generally, it is desired that no or few obstructions be placed in the wind path to the wind turbines. For a typical home in Los Angeles that uses approximately 7300 kWh per year, three 21 ft. tall trees may be required. This is calculated by assuming a solar output of about 10 watts/square foot, requiring about 100 square feet of solar collectors for each annual kWh demand. If one assumes the radius of each tree is about seven feet then each tree presents an area of approximately 153 square feet facing the sun. Since about half of the collectors may not be oriented in the optimal sun position, the inventors estimate that the solar collector portion of three trees will provide just over 3 kWh per year with the balance of energy being provided by the wind turbines. This should cover approximately 75% of the power usage of a typical home in the Los Angeles area.

Figure 7:
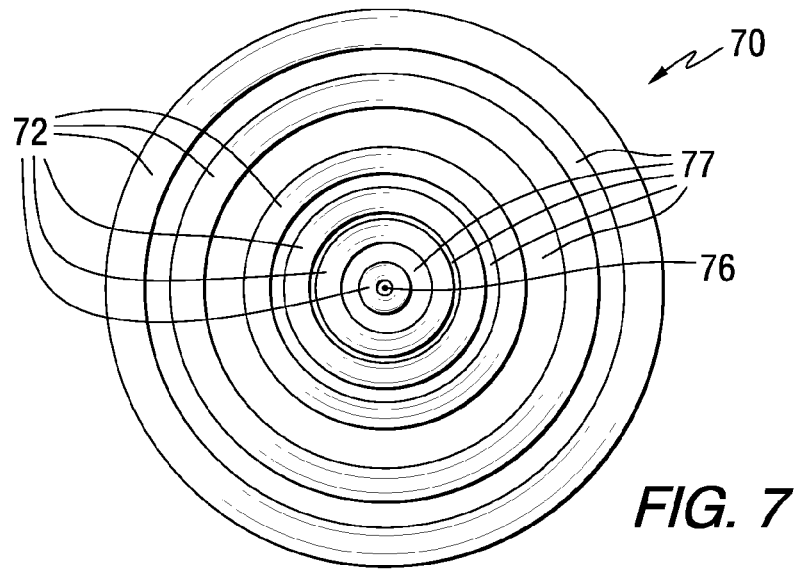
FIG. 7 illustrates a top view of a solar/wind tree according to a different embodiment of the invention.
Figure 8:
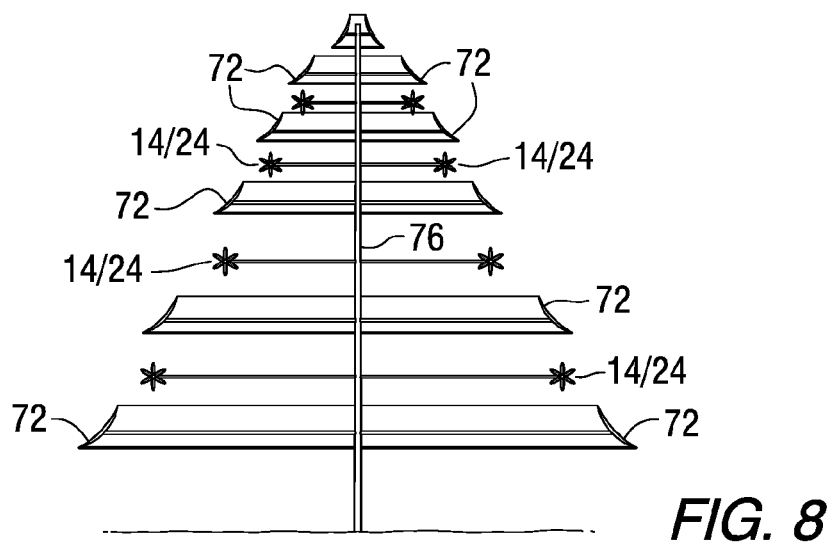
FIG. 8 illustrates a cross-section through the solar/wind tree of FIG. 7.

In another embodiment, a solar/wind tree 70 comprises a plurality of ring-like film solar collectors 72 that encircle a tree trunk 76. See the top-down view of FIG. 7 and the side view of FIG. 8. An open space between each film solar collector is identified by a reference character 77. The solar collectors 72 of this embodiment may be constructed from a solar film, in lieu of a rigid solar panel. Since the collectors encircle the tree trunk 76, they provide unbroken sun exposure (in the circumferential direction) and thus increased electrical generating capacity. The open space between adjacent solar collectors reduces the electrical generating capacity but may be required to reduce the wind forces exerted on the tree 70. As illustrated in FIGS. 7 and 8, the radius of successive solar rings increases from the top to the bottom of the tree 70. Note also in the side view of FIG. 8, the solar film is shown with a slight curvature.

The open space between two successive solar rings 72 may also create an area for mounting the wind turbines 14/24 as illustrated in FIG. 8. In one embodiment, a shape of the rings includes a slight camber (as shown in the side view of FIG. 8), operating as a stationary wing or blade to direct and concentrate the wind in a direction toward the wind turbine. It is expected that the cambered ring of solar collectors will enhance the efficiency of the wind turbines, since each ring is continuous and can therefore direct the wind as it impacts the ring from any direction.

Figure 9:
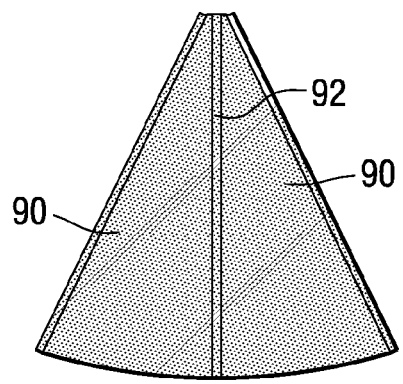
FIG. 9 illustrates a solar power generating structure.

In an area with no or a small wind component, the "tree" of the present invention may comprise a solar tree rather than a solar/wind tree. In this case, additional trees may be required to compensate for the lack of wind turbines. Such an embodiment, illustrated in FIG. 9, includes a solar film 90 configured into a conical shape about a vertical center line 92. This embodiment may not include the wind turbines and may be preferable for use in regions where insufficient wind is available to productively generate electricity. As can be seen, in this embodiment the solar film (or closely spaced solar collectors) are continuous (or nearly continuous) with no or very narrow open regions between collectors. Although depicted generally in the shape of a tree, this is not necessarily required for operation of the solar collectors. However, configuration in a tree shape may make the solar collectors more aesthetically pleasing and thus make their use in a residential neighborhood acceptable.

In another embodiment, a tree of the present invention features only turbines and no solar collectors. For example, the embodiments of FIGS. 1 and 2 without the solar collectors 12.

Figure 10:
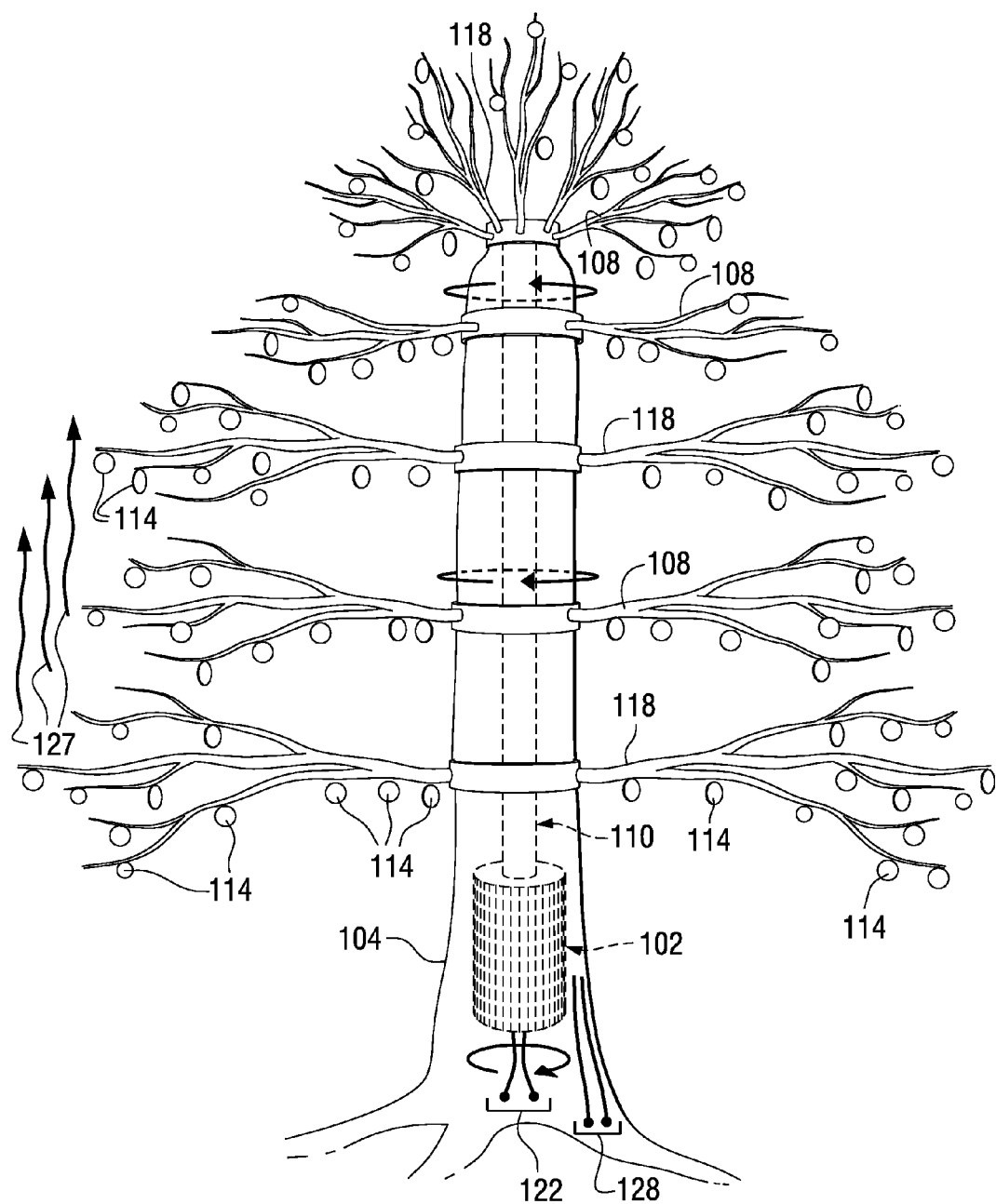
FIGS. 10 and 11 illustrate additional embodiments of solar/wind trees according to the present invention.

Another embodiment of a solar/wind tree 100 is illustrated in FIG. 10. This embodiment includes a generator 102 in a vertical support 104 that is connected to propeller-like rotatable arms 108 via a drive shaft 110. The arms 108 extend radially from the support 104 and comprise elements 114 and other projections that are struck by the wind. These elements and projections may be configured and oriented to absorb maximum energy from the wind. As depicted, the wind-driven arms 108 alternate with fixed solar collector arms 118. Also, the arms 108 may be driven to rotate by heated air as it rises (indicated by arrowheads 127) from the base of the tree toward the tree top. Two separate sources of electricity are illustrated, an output from a wind-driven generator over conductors 122 and an output from a solar collector supplied over conductors 128. These may be combined for convenience if permitted by the parameters of the generated electricity.

The various presented embodiments of the solar/wind tree may not offer the most efficient design in generating a maximum amount of solar and wind energy for the homeowner. But the use of several such solar/wind trees on the property offers a simpler and perhaps a more economical (i.e., lower installation and use costs) apparatus to cover the homeowner's power costs, compared with installing roof mounted solar collectors or installing an unsightly 50 foot tower with a top-mounted wind turbine. Thus the present invention offers a solution that is "about right" when all factors are considered, including the aesthetics of the solar/wind tree and the generating efficiency. To improve the "look" of the tree, it may incorporate artificial leaves and branches (even pine cones in one embodiment) so that the completed structure has the look and feel of a real tree. The solar/wind tree can also be adapted to look like the trees or other vegetation in any particular region of the country.

Figure 11:
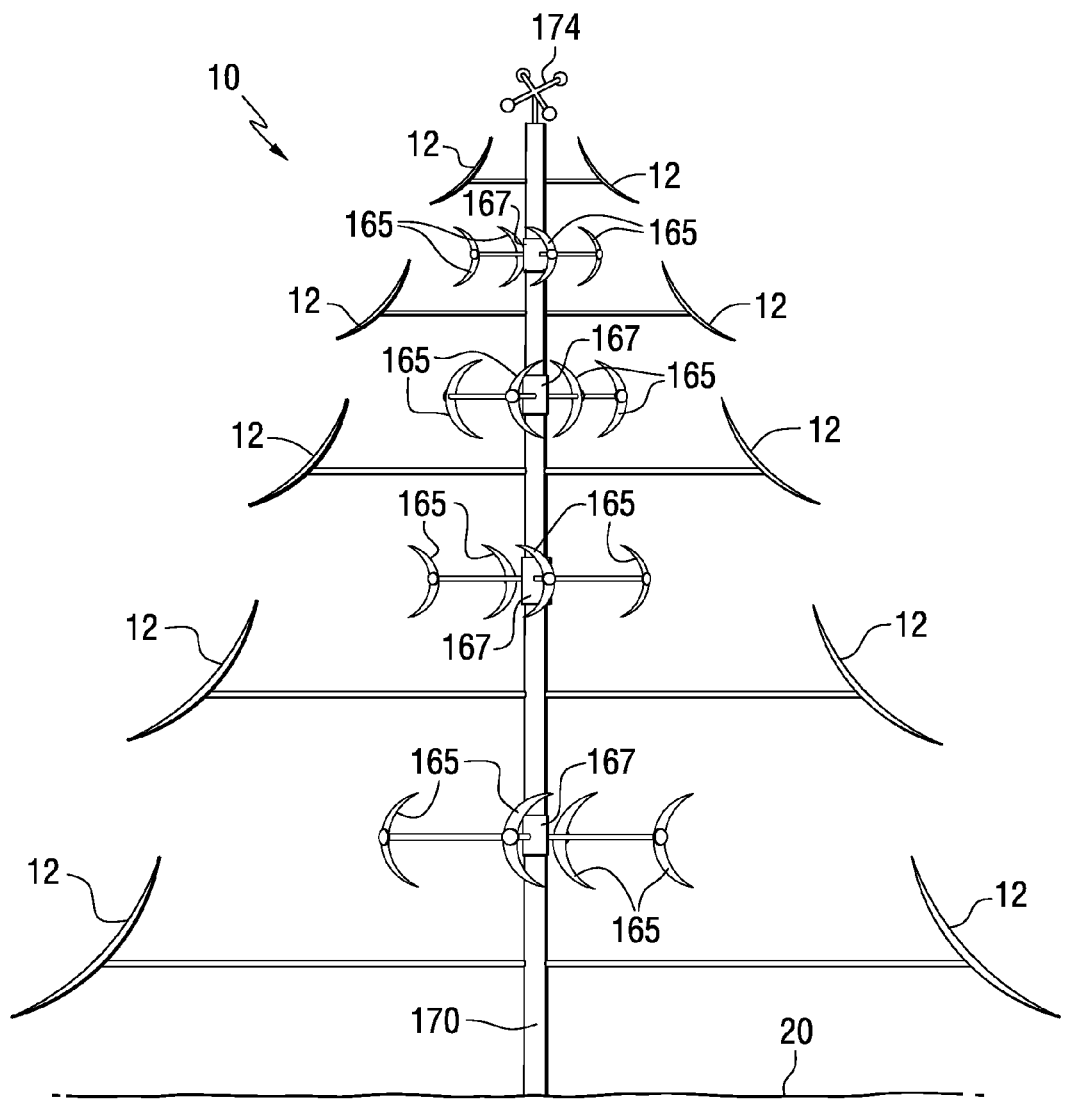

FIG. 11 shows a further embodiment where the generator windings are mounted on the central shaft and the rotational torque, supplied by the wind, causes turbine blades 165 and the connected armature generator windings (not shown) to rotate around stator windings 167 disposed at several different "collar" areas extending from a central shaft 170. In this embodiment the generator elements alternate with the solar collectors 12, leaving adequate space for the wind to be effective above and below the solar collectors 12. An additional embodiment features power generation by induction using magnets at the "collared" areas rather than conventional generator brushes. An anemometer 174 for indicating wind direction and speed is disposed atop the central shaft 170.

Figure 12:
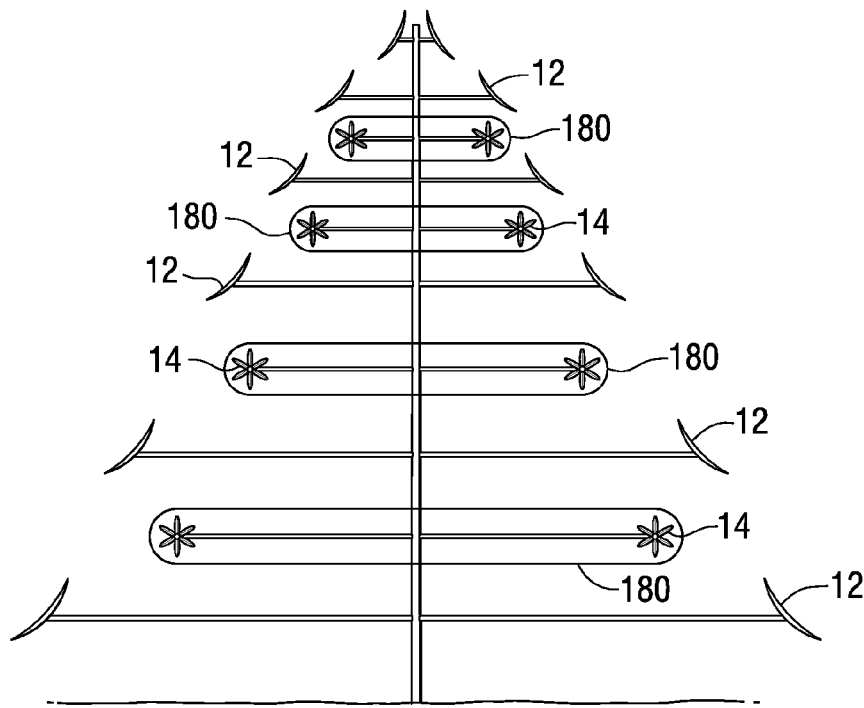
FIGS. 12 and 13 illustrate additional embodiments including protective cages surrounding moving wind turbine elements.
Figure 13:
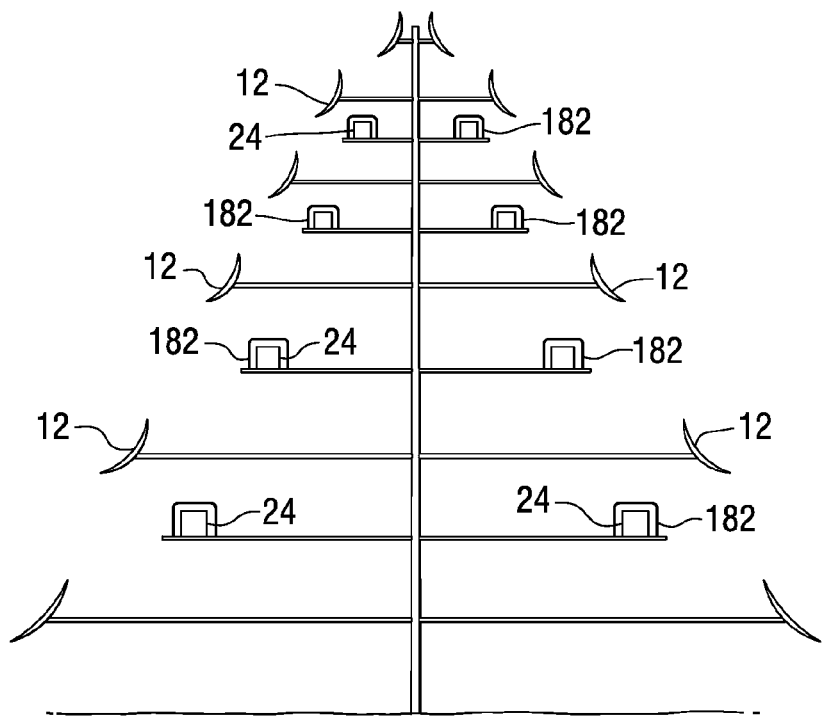

FIGS. 12 and 13 show additional embodiments that feature protective cages 180 and 182 around the moving wind devices so that birds or animals do not contact the moving parts. FIG. 12 applies to the wind turbines illustrated in FIG. 1; FIG. 13 applies to the helical wind turbines illustrated in FIG. 2.

Figure 14A:
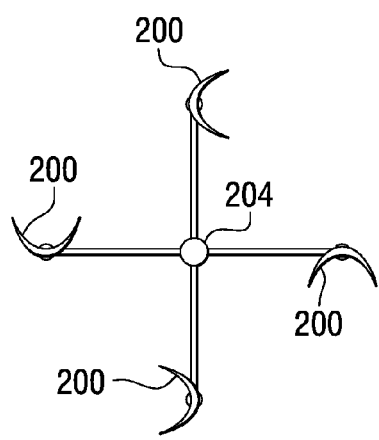
FIGS. 14A and 14B show further embodiments of turbine blades for use with a solar/wind tree of the present invention.
Figure 14B:
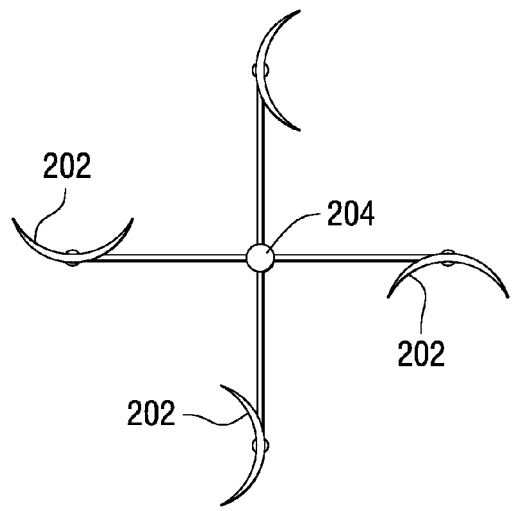

FIGS. 14A and 14B show further embodiments of respective cups 200 and 202 that drive the central shaft 204, for use in lieu of shaped turbine blades. The cups 200 and 202 alternate with the solar collectors 12, as depicted in several figures of the present application, to maximize both wind driven and solar driven energy.

Figure 15:
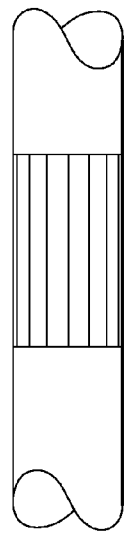
FIG. 15 illustrates a vertically mounted generator winding for use with the present invention.

FIG. 15 illustrates vertically-mounted generator stator windings that are mounted to or disposed around the support shaft or trunk of any of the presented embodiments. Electricity is generated in the vertical windings by interaction with the magnetic field produced by the armature windings.

The various illustrated embodiments may comprise elements (leaves, bark, branches, stems, trunks) that are intended to camouflage the solar energy collectors and the wind turbines and their associated devices. The color, surface texture, size, and appearance of the solar energy collectors, the wind turbines and their associated devices may be selected to appear as vegetation. In FIG. 10, for example, the elements 114 appear to be leaves, the vertical support 104 appears to be a tree trunk and the arms 108 and 118 appear to be tree branches.

A solar/wind tree "farm" or "grove" comprises multiple, relatively closely spaced, solar/wind trees. In a commercial solar/wind tree farm the aesthetic elements may be minimized in an effort to generate the maximum amount of wind and solar energy available at the site. The solar/wind trees are spaced so that the maximum wind and solar energy is gathered at each solar/wind tree.

Many of the present embodiments have been illustrated in a shape of a conical tree, such as a pine tree. However, this is not intended to limit the scope of the present invention. The present invention is intended to include any tree shape and size or any other relatively large vegetative species.

Also, it is not necessary to alternate the solar collectors and the wind turbines, although it may be preferable to arrange the collectors and turbines in a conical shape so that upper solar collectors do not shield lower solar collectors from the solar energy. Those skilled in the art of generators and wind turbines recognize that any of several different generator types (and coil windings) may be used in conjunction with the wind turbine to generate electricity. Any of these generator and winding types are within the scope of the present invention.

While the invention has been described with reference to preferred embodiments, it will be understood by those skilled in the art that various changes may be made and equivalent elements may be substituted for elements thereof without departing from the scope of the present invention. The scope of the present invention further includes any combination of the elements from the various embodiments set forth. In addition, modifications may be made to adapt a particular situation to the teachings of the present invention without departing from its essential scope. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for generating electrical power, comprising:
    a plurality of solar energy collectors for generating electricity from solar energy;
    a plurality of wind turbines for generating electricity from wind energy;
    a support structure having arms extending radially from a vertical shaft, the arms positioned at different vertical distances along the vertical shaft and the arms having different lengths, the arms having decreasing lengths in a direction toward a top of the apparatus;
    solar energy collectors and the wind turbines affixed to terminal ends of the arms, wherein the solar energy collectors and the wind turbines are disposed at different vertical distances along the vertical shaft and the solar energy collectors are shaped and oriented to direct wind streams striking the solar energy collectors toward the wind turbines; and
    the support structure comprising camouflage elements causing the support structure to resemble vegetation.

2. The apparatus of claim 1 wherein solar energy collectors are affixed to arms extending at first levels along the vertical shaft and the wind turbines are affixed to arms extending at second levels along the vertical shaft, the first levels alternating with the second levels.

3. The apparatus of claim 1 wherein a solar energy collector comprises a band of solar energy film affixed proximate terminal ends of the arms.

4. The apparatus of claim 1 wherein each solar energy collector comprises a solar energy panel or a solar energy film material.

5. The apparatus of claim 1 wherein the vegetation comprises a tree and the elements comprise a tree trunk, tree branches and tree foliage.

6. The apparatus of claim 1 wherein the support structure comprises a support structure in a conical shape.

7. The apparatus of claim 1 wherein an orientation of at least one of the solar energy collectors are adjustable responsive to a direction of solar energy impinging the solar energy collectors and blades of the wind turbines are adjustable responsive to a direction of wind energy impinging the blades.

8. The apparatus of claim 1 wherein the wind turbines comprise an electrical generator rotated by wind turbine blades oriented substantially vertical to a ground surface or rotated by a helical wind turbine.

9. The apparatus of claim 1 wherein the wind turbines comprises blades having an adjustable blade pitch.

10. An apparatus for generating electrical power, comprising:
    a plurality of wind turbines for generating electricity from wind energy;
    a conically-shaped support structure having arms extending radially from a vertical shaft, the arms having different lengths with the arm length decreasing toward a top of the apparatus;
    the support structure comprising camouflage elements to resemble a tree, wherein the camouflage elements comprise one or more of a tree trunk, tree branches and tree foliage, the arms resembling tree branches;
    each wind turbine affixed proximate a terminal end of an arm resembling a tree branch.

* * * * *